Jan. 30, 1934.    A. A. ROESCH    1,945,379
AIR CONDITIONING DEVICE
Filed March 4, 1932    3 Sheets-Sheet 1
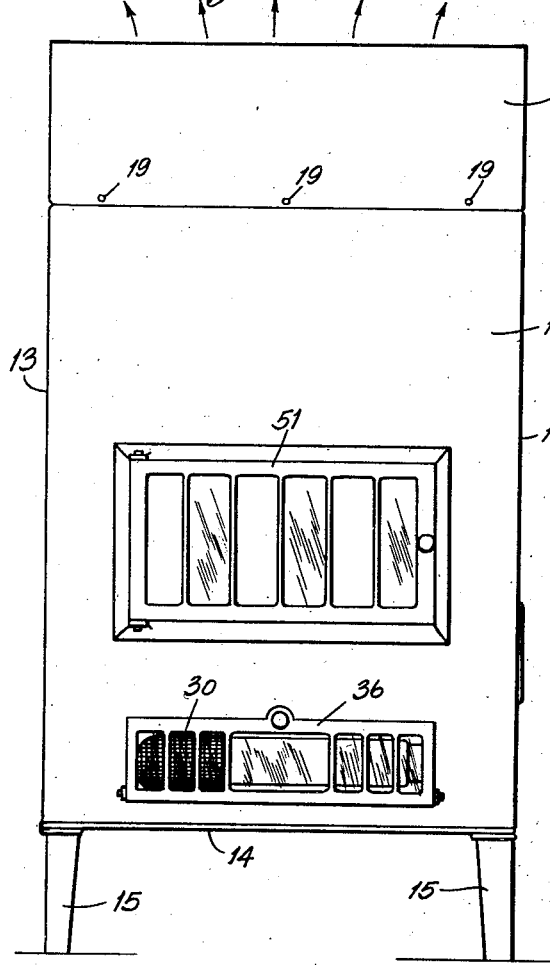
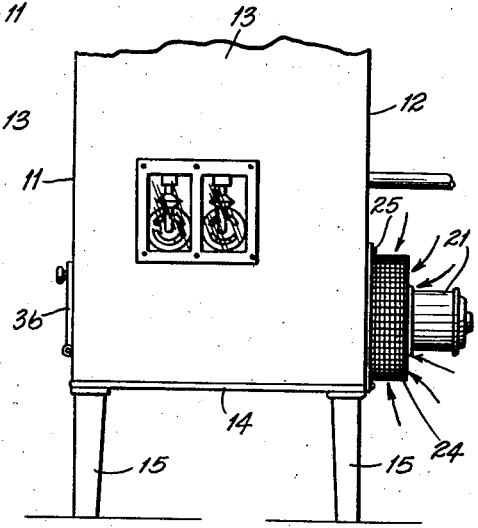
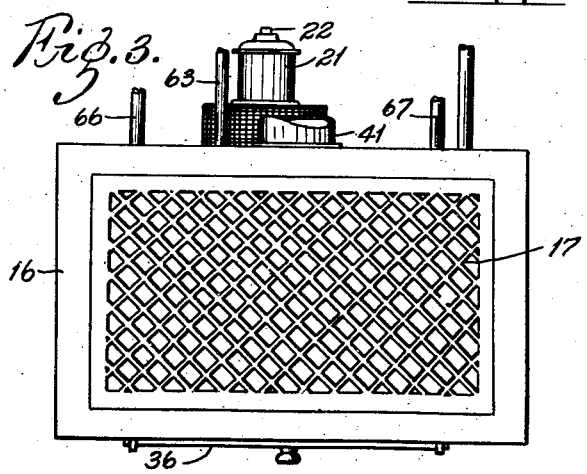
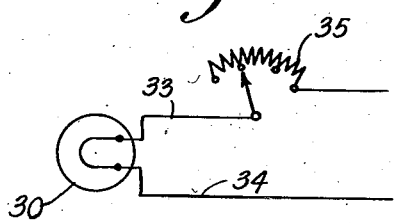
INVENTOR:
ARTHUR A. ROESCH
BY Arthur C. Eckert
ATTORNEY.

Jan. 30, 1934.   A. A. ROESCH   1,945,379
AIR CONDITIONING DEVICE
Filed March 4, 1932   3 Sheets-Sheet 2

INVENTOR:
ARTHUR A. ROESCH,
BY Arthur C. Eckert
ATTORNEY.

Jan. 30, 1934.　　　A. A. ROESCH　　　1,945,379
AIR CONDITIONING DEVICE
Filed March 4, 1932　　　3 Sheets-Sheet 3
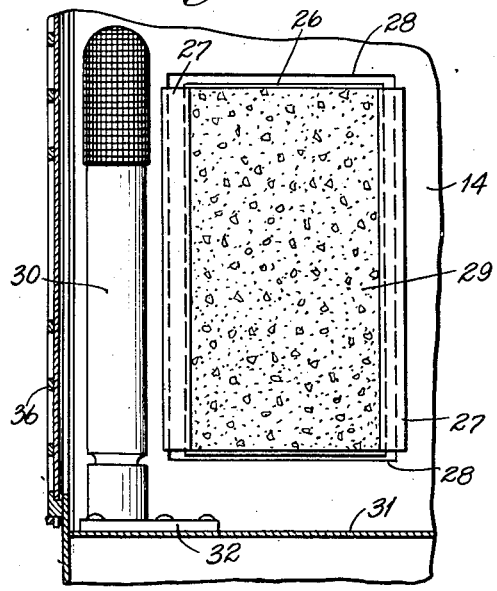
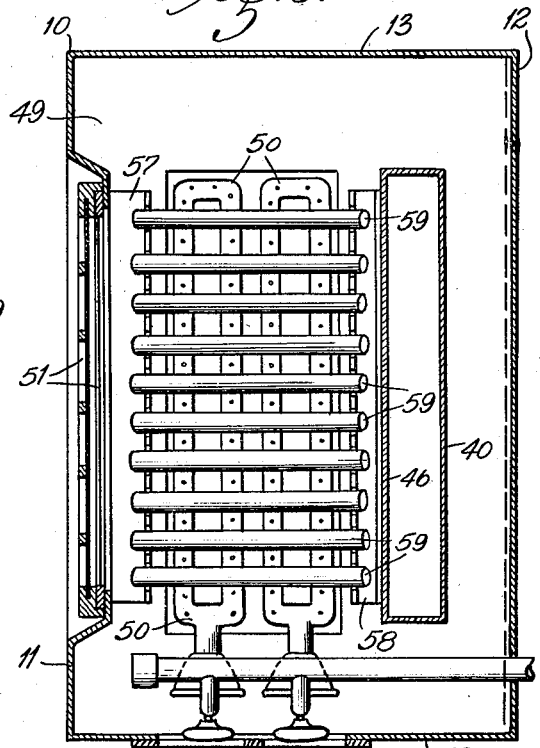
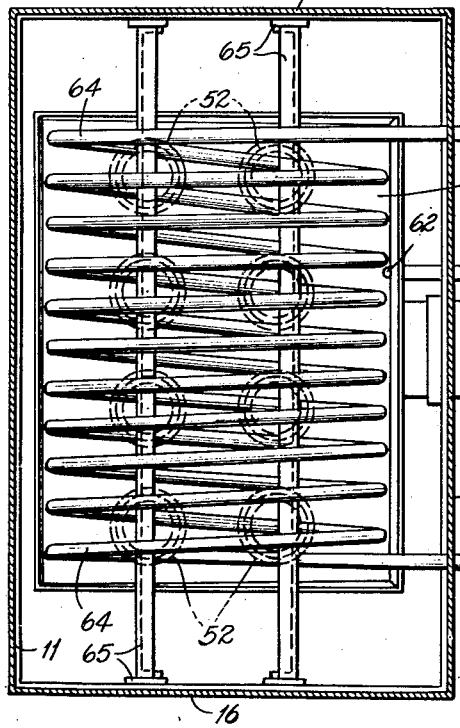
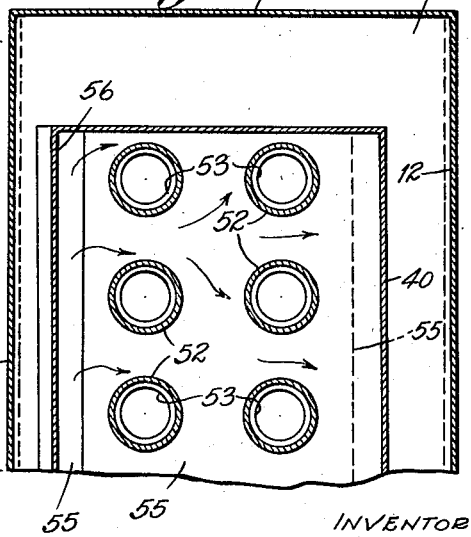
INVENTOR:
ARTHUR A. ROESCH
By Arthur C. Eckert
ATTORNEY.

Patented Jan. 30, 1934

1,945,379

UNITED STATES PATENT OFFICE 1,945,379

AIR CONDITIONING DEVICE

Arthur A. Roesch, Belleville, Ill., assignor to Roesch Enamel Range Company, Belleville, Ill., a corporation of Illinois Application March 4, 1932. Serial No. 596,693

4 Claims. (Cl. 257—9)

The object of my invention is to make an air conditioning device, which provides selectively for heating or for cooling air, which provides means for regulating the humidity of air, and also provides means for ozonizing air. It is desirable to have a single unit for both heating and cooling and such a device is herein described. The heating portion of this device has been illustrated, described and claimed in a companion application Serial No. 596,283, filed March 2, 1932.

It is well known that in summer the humidity is as oppressive as the temperature of the atmosphere. Air at a relatively high temperature, but at a low humidity is less oppressive than air at a lower temperature but at a higher humidity. The device herein described, therefore, provides means not only for cooling or refrigerating air, when used in the summer time, but also provides means for extracting the moisture from air, so as to reduce its humidity. The air that is to be conditioned, that is the air surrounding the device, is mechanically drawn into the device and passed over a medium for moisture extraction. This is accomplished immediately after the air enters the device near its bottom. This is the most effective point for moisture extraction, because the saturation point of the air is the lowest. The air surrounding the exterior of the device near its bottom, is the coolest and for that reason the moisture extraction device is placed in the lowest portion of the air conditioning device. The amount of moisture that is extracted from the incoming air may be regulated. In summer it is better to have the air too dry than too humid. The problem of extracting a sufficient amount of moisture is more difficult than the danger or extracting too great an amount.

While applicant is disclosing chemical means in this application for moisture extraction, he does not desire to be limited to such means. Any mechanical means may be employed that will produce the same result to any degree. The method disclosed comprises the placing of a detachable pan in the air conditioning device in the path of the incoming air and placing a moisture extracting chemical, such as calcium sulphate in the pan. When the chemical is saturated with moisture, the pan may be easily removed and the chemical either discarded or dried. In the latter event, it may be used again.

The reverse of the operation of reducing the humidity, namely, adding moisture to the air by a proper device is described in the aforesaid companion application. The air, after passing over the dehydrator or de-humidifying device passes over, under and around an ozonizing tube, where the oxygen in the air is reduced to its atomic state of ozone. Carbon dioxide, carbon monoxide and other gases containing oxygen that are also present in the air are similarly reduced and separated into their component parts and the oxygen similarly reduced to ozone. This process of ozonizing air finds greater application in a heating device than it does in a cooling or refrigerating device, but the difference is one of degree. Sunlight as is well known is the greatest natural ozonizer. There are other natural means, however, for ozonizing air; one is the decomposing of virgin soil. Many persons are unable, even in summer to subject themselves to the rays of the sun or to the action of virgin soil. The person occupied indoors in cities does not receive any of the benefits of the ozonizing effect of sunlight in the summer time. Neither does he receive any of the benefits of the ozonization due to virgin soil. For such a person, the air that he breathes must be artificially ozonized, even in summer time, in order to produce the most healthful conditions. By the use of the device herein described, conditions approaching those outdoors and in the sunlight may be reproduced indoors and out of the sunlight and in congested areas such as large cities.

The air, after passing over the ozonizing tube, is then forced upwardly over the fire box and through tubes to the uppermost portion of the device.

Refrigeration coils are used to produce the cooling or refrigerating affect. These coils are placed in a cap at the top of the air conditioning device and have two pipe outlets by which the coils may be connected to a source of refrigeration, that is they may be connected to the refrigerating line of the household mechanical refrigeration, or they may be connected to the refrigerating line from a central station plant. Valves are supplied to these two pipes, so that the flow of the refrigerant through the coils may be controlled. It is obvious that when the air passing upwardly in the air conditioning device comes in contact with the refrigerating coils, that it will be chilled and its saturation point lowered, and if sufficient moisture has not been removed previously, water will be precipitated from the coils. In order to avoid the dripping of this water into the air circulation tubes and into the fire box, a pan is provided which is positioned immediately beneath the refrigerating coils and is tilted rearwardly. A pipe is connected to the lower rearward end of the pan and this pipe connected externally to a sewer connection. The air, after having been cooled or chilled, and having had the remainder of its moisture content removed, passes from the device through a perforated top plate. This perforated top plate is detachable, providing easy access to the refrigerating coils. It is to be observed that the positioning of the refrigerating coils relative the entrance of the air to the device is important. If the refrigerating coils are positioned in the device at any point lower than the top, they will chill the air and make it heavier and cause it to fall and and prevent effective, if not entire, circulation. It is impractical to rely on the conduction of the heat from the surface surrounding the device to the walls of the device for cooling the air surrounding the device. The degree to which the temperature of the air is cooled may be regulated by the size of the refrigerating coils and the amount and temperature of the refrigerant passing through them.

It is likewise advantageous to be able to control the ozonization of the air. This is accomplished with a rheostat, that regulates the flow of current to the ozonizing tube.

When the device is to be used for air conditioning in winter, that is when it is to be used to heat the air, as well as purify it, the fire box and the circulatory system for the products of combustion is employed. Any form of heating element or method of heat production may be used. The products of combustion pass around the tubes, previously described, and in order to transmit as much heat from them to the tubes and thence to the fresh air, they pass through a circuitous path under, around and over baffle plates that are shown in the drawings and will be described in this specification. For use in winter, therefore, the refrigerating coils may be convientnly drained of their refrigerant by a convenient stop cock. The dehydrator is removed from the pan in which it is contained and a humidifying element placed in the pan. Water is also placed in the pan with the humidifying element. Obviously to change the device from winter to summer use involves merely the reverse operation. It will be observed that these operations need only be performed at the seasonal change from fall to winter and winter to spring and may be made at practically no cost with a minimum effort. The entire device is self contained and may be made to present an aesthetic appeal and made to conform with any decorative scheme. In summer it may be moved about, the only limitation being that it must be so positioned as to enable it to be connected to a source of electrical energy and a source of refrigeration. In winter, it must be so positioned as to have a flue connection and a fuel source, such as a gas connection, if gas is used, or an oil connection, if oil is used.

The device may be made of few and simple parts that lend themselves easily and cheaply to multiple production. With these and other objects in view, my invention has relation to certain novel features of construction and arrangement of parts, as will be hereinafter more fully described, pointed out in the claims and illustrated in the drawings in which Fig. 1 is a front elevation of my device.

Fig. 2 is a fragmental side elevation of my device.

Fig. 3 is a plan view of my device.

Fig. 5 is a fragmental sectional plan view of my device taken on the line 5—5 of Fig. 4.

Fig. 6 is a sectional plan view taken on the line 6—6 of Fig. 4.

Fig. 7 is a sectional plan view taken on the line 7—7.

Fig. 8 is a sectional plan view taken on the line 8—8 of Fig. 4.

Fig. 9 is a schematic wiring diagram showing the electrical connection to the ozonizing tube with a rheostat connected in the electrical circuit.

Figure 4:
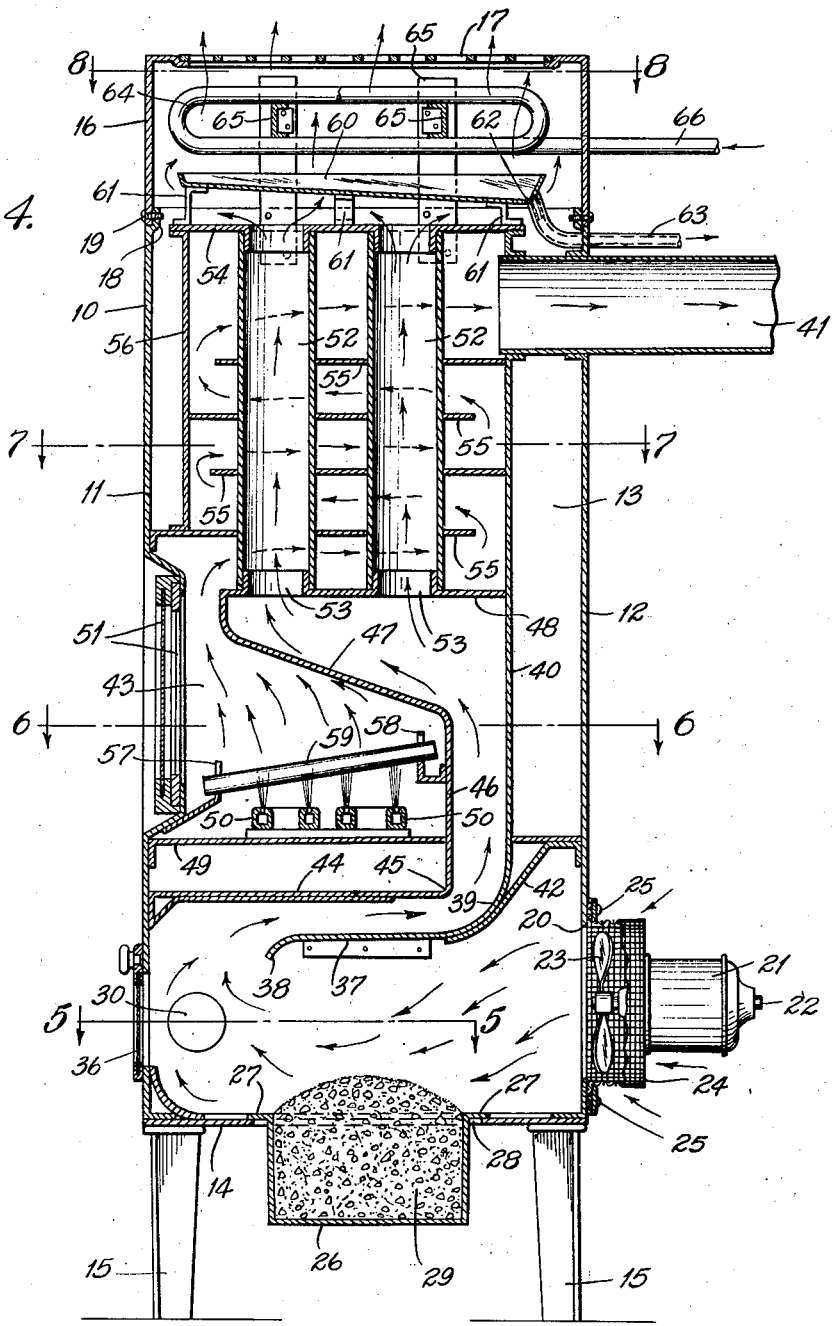
Fig. 4 is a vertical cross section of my device.

Numeral 10 designates a shell having the front wall 11, the rear wall 12, the side walls 13 and the bottom 14. These elements are connected together in conventional manner. Numerals 15 designate legs, one secured at each corner of the bottom 14. Numeral 16 designates a cap having the upper perforated plate 17. The upper edges of the walls of the shell 10 are bent inwardly, as shown at 18, permitting the cap 16 to be seated on the top of the shell 10. Numerals 19 designate bolts or rivets passing through the lower portion of the walls of the cap 16 and through the upwardly bent portion of the shell 10.

In the rear wall 12 of the shell 10 near its bottom is formed the circular opening 20. Numeral 21 designates a motor having the armature 22 operatively secured thereto. Numeral 23 designates a fan secured to the armature 22. Numeral 24 designates a screen shell to which concentrically is secured the motor 21. The screen shell 24 is secured to the shell 10 over the circular opening 20, by means of the bolts 25. By means of the structure thus far described, the air from the exterior of the shell 10 is sucked on account of the rotation of the fan 23, through the screen shell 24 into the shell 10, as indicated by the arrows in Fig. 4.

Numeral 26 designates a pan having the flanges 27, formed on the upper edges of its side walls. Numeral 28 designates a hole formed in the bottom 14 of the shell 10. By means of the flanges 27, the pan 26 is hung through the hole 28 to the bottom 14. Numeral 29 designates a dehydrating element, such as a chemical, for example, calcium sulphate. This chemical is placed in the pan 26, so as to completely fill it and extend above the plane of its upper surface. Numeral 30 designates an ozonizing tube. Numeral 31 designates a false wall, parallel to the side walls 13 and connected to the front wall 11 and the rear wall 12 and the bottom 14. 32 designates an electrical socket secured to the false wall 31 in conventional manner. The ozonizing tube 30 is connected in the electrical socket 32 in conventional manner.

Numeral 33 designates a wire connected to one terminal of the electrical socket 32 and 34 designates a wire connected to the other terminal of the electrical socket 32. The wires 33 and 34 are connected to a source of electrical energy, not shown. In circuit with the wire 33 is included the rheostat 35. It will be seen that by varying the electrical resistance in the circuit with the ozonizing tube 30 that the current flowing in the ozonzing tube 30 may be selectively varied. By this means the activity of the ozonizing tube 30 may be controlled. Numeral 36 designates a glazed door hingedly secured to the front wall 11 immediately in front of the ozonizing tube 30. Numeral 37 designates a plate having one end secured to one of the side walls 13 and the other end secured to the opposite wall 13. The forward edge of the plate 37 is bent downwardly as shown at 38. The plate 37 is bent arcuately upwardly, as shown at 39 and continues vertically upwardly to form the integral plate 40. 41 designates a draft flue passing through the rear wall 12 of the shell 10 and through the plate 40 and secured hermetically to both in conventional manner. Numeral 42 designates a plate secured at one end to the rear wall 12 and bent so as to form a contact at the arcuate jointure between the plate 37 and the plate 40.

Numeral 43 designates the fire box. Numeral 44 designates a plate connected to the front wall 11 immediately above the glazed door 36 and bent vertically at 45 forming the integral plate 46. The upper end of the integral plate 46 is bent forwardly upwardly forming the plate 47 and formed integrally with the plate 48 at its upper end. The plates 44, 46 and 47 are likewise connected to the side walls 13. Numeral 49 designates a plate parallel to plate 44 and connected at one end to the front wall 11 and at the rear end to the plate 46 and to the side walls 13. On the plate 49 in the fire box 43 is positioned the gas burner 50. Numerals 51 designate hinged doors for the fire box 43. Numerals 52 designate tubes, which are connected to the openings 53 in the plate 48 hermetically. Numeral 54 designates a plate to which the upper ends of the tubes 52 are hermetically connected. By the structure thus far described the circulation of air through the screen shell 24 over the pan 26, the ozonizing tube 30 and between the plates 37 and 44 and 40 and 46 into the tubes 52 is indicated by arrows. The products of combustion from the gas burner 50 pass upwardly in the fire box 43, as indicated by the arrows around the tubes 52 and under, over and around baffle plates 55 to the draft flue 41. The products of combustion in their circulation at no time come in contact with the air circulation from the screen shell 24. Numeral 56 designates a false wall parallel to front wall 11 and connecting the lower end of the baffle plate 55 and the plate 54. In the fire box 43, above the gas burner 55 on the brackets 57 and 58 are positioned the imitation logs 59. The bracket 57 is secured to a counter sunk portion of the front wall 11 and the bracket 58 is secured to the plate 46. Numeral 60 designates a drip pan supported on the brackets 61, which brackets 61 are secured on the plate 54. The bottom of the drip pan 60 is inclined rearwardly as shown in Fig. 4. In the lower corner rearwardly from the drip pan is formed a hole 62, which is in fluid communication with the pipe 63, which leads through the rear wall 12 and conducts any fluid that may fall into the drip pan 60 away from the device, preferably to a sewer. Numeral 64 designates a refrigerating coil, which is secured in the cap 16 above the drip pan 60 and in spaced relationship with the drip pan 60 by means of the brackets 65. The brackets 65 are secured to the side walls 13. Numeral 66 designates a pipe connecting to one of the refrigerating coils 64 and 67 designates a pipe connecting to the other end of the refrigerating coil 64. The refrigerant passes in the direction shown in the arrows in Fig. 8, that is, into the pipe 66 through the refrigerating coil 64 and out of the pipe 67. Control valves may be positioned in the pipes 66 and 67 and stop cocks may be placed in them for selectively draining the refrigerant from the refrigerating coil 64.

The air from the tubes 52 passes upwardly through the plate 54 under and around the drip pan 60 and under, over and around refrigerating coil 64 through the perforated plate 17 into the room in which the device is positioned. Any condensed moisture dropping from the refrigerating coil 64 will fall into the pan 60 and be conducted away through the pipe 63. It will be seen by this construction that the purposes of the device are accomplished.

What I claim is

1. In a device of the character described a shell, a fan operatively secured thereon, a dehydrator operatively secured therein, an ozonizing tube operatively secured therein, a heating element and a refrigerating element both operatively secured therein, tubes, baffle plates, said tubes and baffle plates positioned in said shell, so that the air circulation from said fan will pass through said tubes, and that the products of combustion from said heating element will pass around said tubes.

2. In a device of the character described a shell, a cap removably secured to said shell, refrigerating coils positioned in said cap, a drip pan in operative relationship with said refrigerating coils, a fan operatively secured thereon, a dehydrator operatively secured in said shell, an ozonizing tube operatively secured in said shell, a heating element operatively secured in said shell, tubes, said tubes positioned in said shell, so that the air circulation from said fan will pass through said tubes and that the products of combustion from said heating element will pass around said tubes.

3. In a device of the character described a shell, a fan operatively secured thereon, an ozonizing tube operatively secured therein, a heating element and a refrigerating element both operatively secured therein, tubes, said tubes positioned in said shell so that the air circulation from said fan will pass through said tubes and that the products of combustion from said heating element will pass around said tubes.

4. In a device of the character described a shell, a fan operatively secured thereon, an ozonizing tube operatively secured in said shell, a refrigerating element operatively secured therein, tubes, said tubes positioned in said shell, so that the air circulation from said fan will pass through said tubes, a refrigerating coil positioned in the path of the air from said tubes.

ARTHUR A. ROESCH.